United States Patent
Cabaret et al.

(10) Patent No.: US 8,125,351 B2
(45) Date of Patent: *Feb. 28, 2012

(54) PROCESS FOR TRANSMITTING DATA BETWEEN AT LEAST ONE COCKPIT DISPLAY SCREEN AND AT LEAST ONE REMOTE CLIENT SYSTEM

(75) Inventors: Remi Cabaret, Toulouse (FR); Edith Renault, Toulouse (FR); Fulgence Rollet, Toulouse (FR); Philippe Haas, Toulouse (FR); Julien Nico, Tournefeuille (FR); Estelle Pimouguet, Fonsorbes (FR)

(73) Assignee: Airbus France, Toulouse (FR)

( * ) Notice: Subject to any disclaimer, the term of this patent is extended or adjusted under 35 U.S.C. 154(b) by 170 days.

This patent is subject to a terminal disclaimer.

(21) Appl. No.: 12/465,775

(22) Filed: May 14, 2009

(65) Prior Publication Data
US 2009/0287787 A1 Nov. 19, 2009

(30) Foreign Application Priority Data
May 16, 2008 (FR) ..................................... 08 53178

(51) Int. Cl.
*G08B 21/00* (2006.01)
(52) U.S. Cl. ........................................ 340/945; 370/310
(58) Field of Classification Search .................. 340/945; 370/310; 380/255; 455/517; 709/203, 218, 709/228; 713/182
See application file for complete search history.

(56) References Cited

U.S. PATENT DOCUMENTS

| | | | | | |
|---|---|---|---|---|---|
| 5,661,517 | A | * | 8/1997 | Budow et al. | 725/60 |
| 5,689,419 | A | * | 11/1997 | Massat | 701/14 |
| 5,713,075 | A | * | 1/1998 | Threadgill et al. | 455/427 |
| 5,805,807 | A | * | 9/1998 | Hanson et al. | 370/340 |
| 5,848,246 | A | * | 12/1998 | Gish | 709/228 |
| 6,160,551 | A | * | 12/2000 | Naughton et al. | 715/769 |
| 6,175,922 | B1 | * | 1/2001 | Wang | 713/182 |
| 6,373,950 | B1 | * | 4/2002 | Rowney | 380/255 |
| 6,917,863 | B2 | * | 7/2005 | Matos | 701/2 |
| 2007/0013693 | A1 | * | 1/2007 | Hedrick | 345/419 |

FOREIGN PATENT DOCUMENTS

| | | | |
|---|---|---|---|
| FR | 2 838 585 A | 10/2003 | |
| FR | 2 907 996 A | 5/2008 | |

* cited by examiner

*Primary Examiner* — John A Tweel, Jr.
(74) *Attorney, Agent, or Firm* — Perman & Green, LLP

(57) ABSTRACT

A process for transmitting data between at least one display screen in a cockpit and at least one remote client system includes at least one computer, in which the display screen displays a first request to send a message in a first communication protocol; this message is sent to the remote client system over a first link using a second communication protocol. A request to confirm a message is generated and displayed on the display screen via a communication interface designed to receive and generate messages in this first communication protocol and to receive and generate messages that can be received by the remote client system. The request to confirm the message from the first request is validated by activating a confirmation device separate from the at least one display screen; activating this confirmation device sends a confirmation message via a router system to the remote system awaiting confirmation; this confirmation message, not generated in the first protocol, can be received by the remote client system awaiting confirmation; the router system includes at least one second link separate from the first link.

13 Claims, 1 Drawing Sheet

PROCESS FOR TRANSMITTING DATA BETWEEN AT LEAST ONE COCKPIT DISPLAY SCREEN AND AT LEAST ONE REMOTE CLIENT SYSTEM

CROSS-REFERENCE TO RELATED APPLICATIONS

This application claims priority to and the benefit of French Application No. 08 53178, filed on 16 May 2008.

BACKGROUND

1. Field

The disclosed embodiments concern a process for transmitting data between at least one cockpit display screen in an aircraft and at least one remote client system. The disclosed embodiments also concern an aircraft cockpit for this process.

The disclosed embodiments are particularly suited for transmitting data according to the ARINC 661 protocol between an aircraft cockpit and a remote client system ensuring that the data are actually recognized by the remote system.

2. Brief Description of Related Developments

The ARINC 661 protocol was developed by the aeronautics industry to set an industrial standard, on one hand, for a graphic interface of display screens for the CDS "cockpit display system" and, on the other hand, a communication protocol between a client system and the cockpit.

This communication protocol makes it possible to send events, such as the selection of a button, from the cockpit to the client system.

According to the ARINC 661 protocol, the cockpit operating system must have a kernel capable of generating the prioritized structure of the graphic interface from a definition file (DF) during the initialization phase, or definition phase, of the CDS. This kernel also makes it possible to broadcast events.

The definition file is a binary file that therefore contains a list of "widgets" that the client system will need to generate its HMI pages that must be displayed in the cockpit. A given definition file is combined with a single client system (UA—"User Application"), but this client system can use several definition files. The widgets are stored in a library managed by the CDS.

The widgets can be interactive, i.e., they can accept actions by the crew and react to them.

These interactive commands are very practical, since they allow the aircraft pilot to work, purely by way of illustration, from the same support, namely his display screen, to execute and follow a task, such as in-flight fuel delivery. They thus help reduce the pilot's workload and his stress.

But spot malfunctions can be observed in these systems, such as spontaneous updating of data by a client system without action by the pilot of the aircraft.

Consequently, it is imperative to enhance the reliability of the interactive cockpit commands to avoid a command at the wrong time or the corruption of a command by the system, which would have negative effects on the aircraft and its passengers.

In order to protect ARINC 661 data exchanges, communication between the CDS 1 and the remote client system 2 relies on a point-to-point communications system such as the TFTP data-transfer protocol (a simplified file transfer protocol) (FIG. 1).

Secure communication then relies on transmission of an acknowledgement 3 of receipt of ARINC 661 data 4 by the client system 2.

It is known how to connect this remote client system 2 to a computer in charge of controlling this remote client system, to give it the fail safe criterion necessary in the aeronautics field.

However, the use of point to point communication between the CDS 1 and the remote client system including the remote client system 2 and its control computer does not make it possible to be sure ARINC 661 data or notifications are received by the control computer.

It follows that the level of reliability offered by a display screen with interactive commands from a cockpit is insufficient for certain remote client systems of the aircraft like the FUEL system dedicated to in-flight refueling.

French patent application No. 07 57064 by this applicant describes a system and a process for transmitting data between at least one display screen using an interactive command and a client system.

This system makes it possible to obtain a high level of reliability by displaying onscreen a request to confirm new data entered by the crew of the aircraft.

This system consequently involves two actions on the part of the pilot of the aircraft, namely entering the new data himself and consequently modifying previously recorded data and confirming this change.

Before this data transmission process, he must make sure that the right values or changes have been recognized by the remote client system.

Although this system gives very satisfactory results in terms of securing data or commands transmitted from the cockpit to a remote client system, it can still be further improved.

Indeed, some functions offered by the CDS of an aircraft to make it easier to fly, such as updating the weight of the aircraft for low-altitude flight, retiming the aircraft position or inserting a TRN sensor ("Terrain Reference Navigation") to calculate the hybrid position of an aircraft flying at low altitude, use interactive commands that affect the safety of the aircraft, so these functions require total independence between the data or command acquisition paths by the remote client system and the data or command confirmation paths by the crew.

Now, the system described above does not make it possible to achieve the total independence required. The controls of the display system composed of the keyboard, mouse, display screen and the connection permitting data transmission are common points, since they not only allow the parameters to be updated, but they also allow the updates to be confirmed.

The consequences of a potential failure of these common points are, of course, then critical, not only for the aircraft, but also for the crew and the passengers.

SUMMARY

The aspects of the disclosed embodiments therefore propose a process for transmitting data between at least one display screen and one remote client system that has a simple design and operating mode and not only makes sure the messages that come from the requests displayed on the screen are recognized by the computer or the remote client system computers, to achieve a higher level of reliability than those currently reached, but also permit validation or confirmation of those messages by a message-forwarding line independent of the technical means (display screen, ARINC 661 protocol, communication link between the display screen and the remote client system . . . ) that are used to require modification of data or a command and to send this modification to the remote client system.

To this effect, the aspects of the disclosed embodiments concern a process for transmitting data between at least one display screen of an aircraft cockpit and at least one remote client system; the remote client system includes at least one computer with a display screen on which a first request to send a message in a first communication protocol appears; the message is sent to the remote client system over a first link using a second communication protocol.

According to the aspects of the disclosed embodiments, a request for confirmation of the message from the first request is generated and displayed on the display screen via a communication interface designed, on one hand, to receive and generate messages in the first communication protocol and, on the other hand, to receive and generate messages that can be received by the remote client system, the request for confirmation of the message from the first request is validated by activating a separate confirmation device of said at least one display screen; activating this confirmation device sends a confirmation message via a router system to the remote system awaiting this confirmation; the confirmation message not generated in the first communication protocol can be received by this remote client system awaiting confirmation; the router system includes at least one second link separate from the first link.

This confirmation device will allow the pilot to finalize the update of the data or command introduced by the display from the first request on his cockpit screen. This confirmation device is preferably a manually activated device designed to generate a confirmation message.

Preferably, the confirmation request comes in the form of an interactive means of information, such as a window displayed on the screen offering a hotspot for "cancellation" of the message from the first request and a text area asking the pilot to activate said confirmation device placed in the cockpit to validate the message (data or command) that came from the first request.

Since the cancellation has no critical consequence on the safety of the aircraft, it is traditionally done on the display screen using the ARINC A661 communication protocol.

In different special embodiments of this data-transmission process, each having its special advantages and each capable of many possible technical combinations:

the confirmation device is directly connected to the remote system by this second link.

In this embodiment, a single remote system is connected to the confirmation device, which can be a button or a switch, both being manually activated.

This router system includes a central confirmation unit connected, on one hand, to the confirmation device by this second link and, on the other hand, to remote systems by other separate links; a raw data message is sent to the central unit parallel with the sending of the request to confirm the message in the first request; the raw data message is designed to allow the central unit to identify the remote client system awaiting confirmation of the message from the first request from among the remote client systems.

When the message from the first request has been validated by activating the confirmation device, the confirmation device sends a message over the second link to the central confirmation unit; after the central unit receives this message, it sends the confirmation message to the remote system awaiting confirmation. This central unit, which can be an independent computer, is separate from the final users of the confirmation, i.e., the remote client systems.

"Raw data" is understood as being non-ARINC 661 data, such as Boolean data, numbers or character chains. These data are sent without a TFTP protocol.

When the message from the first request is validated, this causes the confirmation device to send a confirmation message over a second link to the central confirmation unit, which after it receives this message, verifies that a single request to confirm the first request has been received by said at least one display screen before sending this confirmation message to the remote system awaiting said confirmation.

The central confirmation unit is in charge of routing the confirmation message to the right remote client system. This central unit makes sure also that only one request is made simultaneously. Indeed, it will route the confirmation message only if there is only one confirmation request open. If not, no message is sent to the group of remote client systems when the pilot activates the confirmation device. This mechanism prevents, in particular, any untimely confirmation of request simultaneously with a request really made by the crew.

The confirmation request is allowed to be displayed by said at least one display screen during a response-solicitation time t, after which without receipt of the confirmation message by the remote client system awaiting confirmation of the message from said first request, the latter sends a message to cancel the confirmation request at least to the display screen.

When no confirmation or cancellation by the crew is received, the remote client system will automatically cancel its confirmation request after a certain time lapse, for example 30 seconds. The consequences for the display are equivalent to manual cancellation by the crew.

The first communication protocol is the ARINC 661 Protocol, the second communication protocol is a data transfer protocol such as the Simplified File Transfer Protocol (TFTP), said remote client system includes a remote client system connected to the display screen by the first link and a computer to control this remote client system by being connected to it over a third link separate from the first and second links, and after the message from the first request is received by this client system, the computer sends a raw data message to have information linked to the message from the first request displayed on said screen, or on another display screen by a link separate from the first and third links, to make it possible to control this message.

Of course, this raw data message sent by the computer requires its intermediate reception by a communication interface, which alone can generate a message in the first communication protocol so that the display screen displays this information linked to the message from the first request.

This step is advantageously performed in parallel with the remote client system sending a raw data message to the communication interface to display the confirmation of the message from the first request.

The command or value entered by the crew at the time of the first request can thus be re-displayed on the same screen by the computer controlling the remote client system, to permit control by the crew. Alternatively, for reasons of homogeneity of pilot dual-verification procedures, the value is re-displayed on another display screen.

The aspects of the disclosed embodiments also concern an aircraft cockpit for using the data-transmission procedure described previously; this cockpit has at least one screen that can present an interactive information medium to display a first request to send a message in a first communication protocol and to transmit this message to a remote client system over a first link using a second communication protocol; this remote client system has at least one computer.

According to the aspects of the disclosed embodiments, the cockpit has a communication interface designed, on one hand, to receive and generate messages in the first communication protocol, and, on the other hand, to receive and generate messages that can be received by the remote client system. Since the remote client system is awaiting confirmation of the message from the first request, the cockpit also has a manually activated confirmation device designed to generate a confirmation message and a router system to send the confirmation message to this remote client system awaiting confirmation of the message; this confirmation message, not generated in the first protocol, can be received by the remote system; the router system includes at least one second link separate from the first.

Purely by way of illustration, this confirmation message that can be received by the remote system awaiting confirmation of the message from the first request is a raw data message.

The interactive means of indicating the first request can be a window that is shown on a screen and proposes modification of a value in a combined area, i.e., an element in a dialogue box with a text area and an open list area, or a field where a value can be entered.

In different special embodiments of this cockpit, each having its special advantages and each capable of many possible technical combinations:
- the confirmation device is connected directly to said remote system by said second link,
- the router system includes a central confirmation unit separate from the remote client systems; this central unit is connected to the confirmation device by the second link and to the remote systems by other separate links,
- the link between the display screen and the remote client system is a point to point connection; the communications interface is placed on the display screen.
- Since the display screen is connected by a point to multipoint link to the remote client system, the communication interface is placed in the computer, and this communication interface has a destination address and is designed to receive the message in the first communication protocol,
- the first communication protocol is the ARINC 661 Protocol,
- the cockpit has a selection and control device to select a particular datum in a series of data presented on the display screen in the form of a request.

Purely by way of illustration, this selection and control device can be chosen from the group that includes a trackball, a joystick and a touch pad.

The cockpit has a keyboard for entering data in the field of a window displayed on the screen.

The disclosed embodiments also concern an aircraft equipped with a cockpit, as described previously.

Preferably, this aircraft has remote client systems connected to the cockpit, these remote client systems are chosen from the group including a trio of identical computers; said confirmation unit is connected to each of these computers; a remote client system and a computer to control said remote client system; said computer is connected to said remote client system by a third link separate from said first and second links, and a combination of these elements.

In the case of the computer controlling the remote client system, the architecture is the COM-MON type, i.e., the remote client system has two parts, COM and MON, functionally identical but made differently. An agreement between the outputs of these two parts COM and MON is then necessary to transmit the output data to the outside.

Alternately, this type of COM-MON architecture can advantageously be replaced in the remote client system by a trio of identical computers. These computers are, purely by way of illustration, the GPS inertial reference system type (GADIRU). The consequences are critical only if 2 computers out of 3 receive the wrong value or an untimely confirmation.

BRIEF DESCRIPTION OF THE DRAWINGS

The aspects of the disclosed embodiments will be described in greater detail with reference to the attached drawings.

DETAILED DESCRIPTION OF THE DISCLOSED EMBODIMENTS

Figure 1:
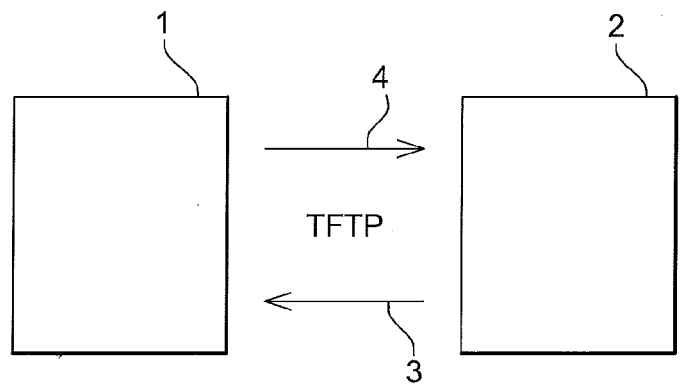
FIG. 1 shows an example of data transmission between a display screen and a client system of the prior art.
Figure 2:
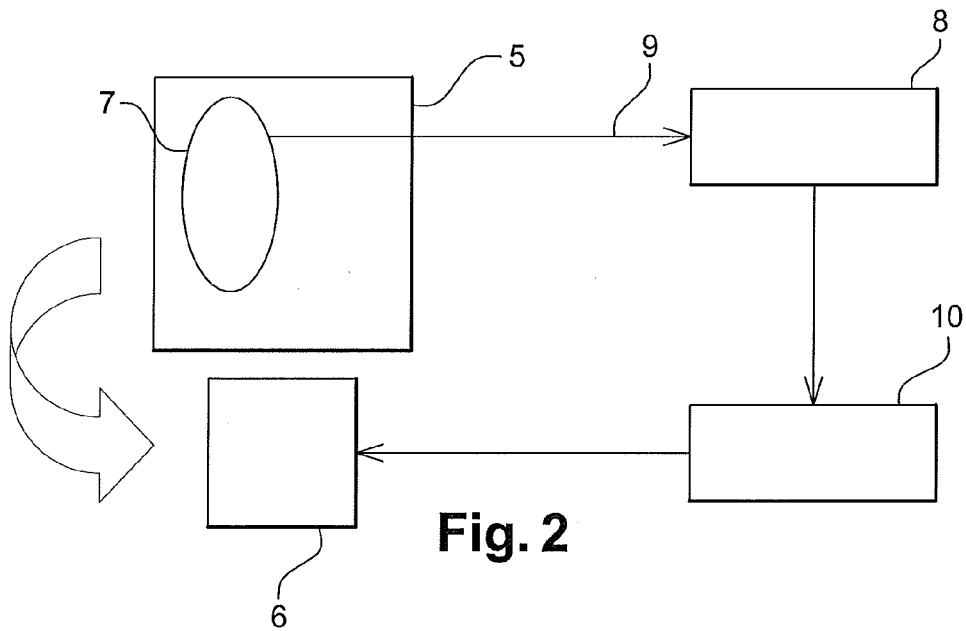
FIG. 2 is a schematic drawing of a step in the transmission of modified data according to one preferred embodiment of the process.
Figure 3:
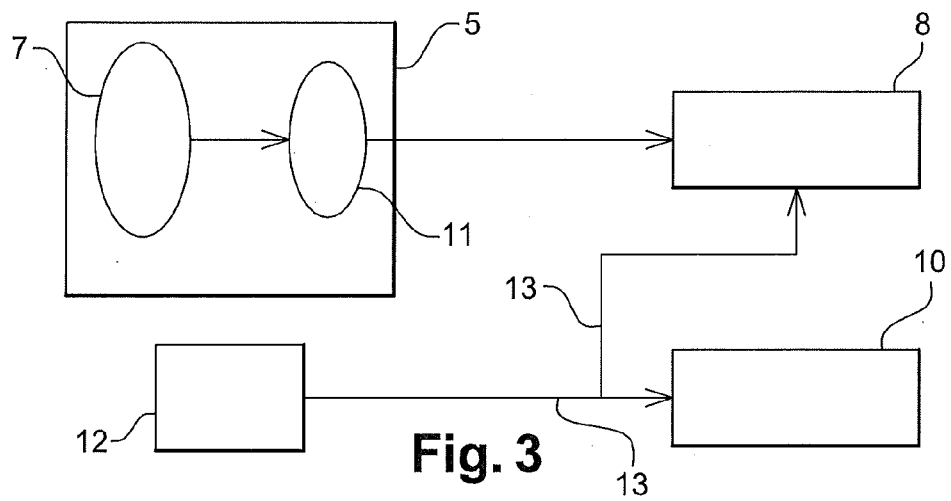
FIG. 3 is a schematic view of the final step in FIG. 2, transmission by the communication interface of confirmation of the modified data to the remote client system and the control unit.

FIGS. 2 and 3 show the data-transmission system and process in one preferred embodiment. This system has two display screens 5, 6 each having a kernel 7.

Purely by way of illustration, these interior display screens 5, 6 are LCD color screens. The displays produced by these display screens 5, 6, particularly when they are applied to a head-down cockpit screen, use basic signs such as numeric characters, alphanumeric characters, straight segments . . . and potentially distinguishable colors.

The display screens 5, 6 are placed in the cockpit facing a post placed between the pilots' seats (not shown). This post has a system of controls. These controls include, in particular, a QWERTY keyboard and a trackball for each pilot. Each trackball has special buttons, such as "click," "Menu," "More/Less", . . . .

The display screens 5, 6 allow the pilot to dialogue with the remote client system including a remote client system 8 and a computer to control this remote client system, with a view to revising a task or executing a particular task. The keyboards, trackballs and special buttons also participate in this dialogue between the pilot and the remote client system, allowing him either to introduce data into a text field or select a value in a combined area displayed on the screen 5, 6. They can also make it possible to refuse to confirm a value or command.

In the latter case, the trackballs can make it possible to move a cursor on the screen generated on the display screen to select a hotspot in a dialogue box displayed on the screen symbolizing "cancellation" and to click on this hotspot.

The kernel 7 on the display screen 5 makes it possible, for example, to send events, such as the selection of a value or command, from this display screen to the remote client system 8, which has a destination address. The display screen 5 and the remote client system 8 are connected by a link 9 which is a point to point link here. The communication protocol between the display screen 5 and the remote client system 8 is the ARINC 661 communication protocol.

The remote client system 8 is controlled in the usual way by an independent computer 10.

A communication interface 11 is placed on the display screen and can, on one hand, receive and generate messages in the ARINC 661 protocol and, on the other, receive and issue raw data messages to the remote client system 8 and the computer 10 to make sure that the events are recognized by the computer.

In one preferred embodiment, a command or value modified in the remote client system 8, 10 is confirmed by following the steps described below.

First of all, a first request to send a message in the ARINC 661 communication protocol is made to appear on the display screen 5. This request can come in the form of a display of a text field to be filled in, with the remote client system 8 requesting entry of a modified value, for example.

Once the value is entered by the pilot, the kernel 7 sends a message in the ARINC 661 protocol to the remote client system 8 with a destination address, using a data transfer protocol such as the Simplified File Transfer Protocol (TFTP). This TFTP protocol also ensures receipt of error codes if the remote client system 8 is not able to accept this transfer.

Upon receipt of this message containing the modified value entered by the pilot, the remote client system 8 sends a raw data message to the communication interface 11. This message is aimed at having the modified value confirmed by a confirmation device 12, which is located in the cockpit and is accessible to the pilot for manual activation.

This confirmation device 12 is connected by a link 13 such as a discreet link, directly to this remote client system 8, 10 awaiting confirmation of the message that came from the first request.

The raw data message thus constitutes a written request from the remote client system 8 asking the communication interface 11 to open a confirmation window for the modified value. The raw data message is, for example, encapsulated in an AFDX message for transfer. Alternately, another aeronautic communication support can be used to transmit this raw data message, for example a CAN bus, an A429 link, a serial connection or something else.

Upon receipt of this request, the communication interface 11 sends a message in the ARINC 661 communication protocol to the kernel 7 to display a second request to send a message. This second request appears on the display screen 5 in the form of a confirmation window. This window can include a text area inviting the pilot to confirm the message from the first request by activating the confirmation device 12 or cancel this message by pressing a hotspot symbolizing "cancellation" of this message.

In parallel, the computer 10 sends a raw data message to the other display screen 6 to have information linked to the first request displayed, here the modified value, so as to be able to control the message from the first request. This raw data message can also be encapsulated in an AFDX message.

The crew can then verify that the value entered in the first request has been recognized correctly by the remote client system 8, 10.

If the pilot confirms modification of the value by activating the confirmation device 12, it sends a confirmation message, such as a raw data message over the discreet link 13.

This ensures, by a completely independent means of communication, that the modification of the value or command is recognized by the remote client system 8, 10.

When the value entered by the first request is wrong, the pilot can cancel modification of this value or command by pressing on a hotspot on the display screen symbolizing "Cancellation."

The kernel 7 then transmits the event, i.e., cancellation of the modified value, by a message in the ARINC 661 protocol to the communication interface 11 (FIG. 3). When the communication interface 11 receives this message, it sends a raw data message both to the remote client system 8 and to the computer 10 to inform them of the cancellation of the first request.

In one preferred embodiment of the process, the closing of the confirmation window is controlled by the remote client system 8. The remote client system asks to have the confirmation window closed by sending a raw data message to the communication interface 11. Upon receipt of this request, the communication interface 11 sends a message in the ARINC 661 communication protocol to the kernel 7 to close this confirmation window.

What is claimed is:

1. A process for transmitting data between at least one display screen of an aircraft cockpit and at least one remote client system, with said remote client system including at least one computer, in which said display screen can show a first request to send a message in a first communication protocol, with said message sent to said remote client system over a first link using a second communication protocol, comprising:

generating and displaying a request to confirm the message of said first request on said display screen by a communication interface designed, on one hand, to receive and generate messages in said first communication protocol and, on the other hand, to receive and generate messages that can be received by the remote client system including at least one computer, validating a confirmation request of said message from the first request by activating a confirmation device separate from said at least one display screen; activation of said confirmation device sends a confirmation message via a router system to the remote system awaiting said confirmation; said confirmation message, not generated in said first protocol, can be received by said remote client system awaiting said confirmation; said router system includes at least one second link separate from said first link.

2. The process as claimed in claim 1, further comprising that said confirmation device is directly connected to said remote system by said second link.

3. The process as claimed in claim 1, further comprising that said router system includes a central confirmation unit connected, on one hand, to said confirmation device by said second link and, on the other hand, to said remote systems by other separate links; a raw data message is sent to said central unit in parallel with the sending of the request to confirm said first request; said raw data message is designed to allow said central unit to identify said remote client system awaiting confirmation of the message from said first request among said remote client systems.

4. The transmission process as claimed in claim 3, further comprising that validation of the message from said first request causes said confirmation device to send a confirmation message over said second link to said central confirmation unit; after said central confirmation unit receives said message, it verifies that a single request to confirm the message from said first request has been received by said at least one display screen before sending said confirmation message to said remote system awaiting said confirmation.

5. The transmission process as claimed in claim 1, further comprising that said remote client system includes a remote client system connected to said display screen by said first ink and a computer to control said remote client system by being connected to the latter by a third link separate from said first and second links, and by the fact that following receipt of the message from the first request by said client system, said computer sends a raw data message to display information associated with the message from said first request on said display screen, or on another display screen by a link separate from said first and third links, so as to be able to control said message.

6. The transmission process as claimed in claim 1, further comprising that said confirmation request is displayed by said at least one display screen during a response solicitation period t, after which without receipt of said confirmation message by said remote system awaiting confirmation of the message from said first request, said system sends a message canceling said confirmation request to at least said display screen.

7. The transmission process as claimed in claim 1, further comprising that the transmission process is implemented in the aircraft cockpit; wherein said cockpit includes at least one display screen that can present a means of interactive indication to display a first request to send a message in a first communication protocol and to transmit said message to a remote client system over a first link using a second communication protocol; said remote client system includes at least one computer, characterized by the fact that said cockpit has a communication interface designed, on one hand, to receive and generate messages in the first communication protocol and, on the other hand, to receive and generate messages that can be received by the remote client system, and wherein said remote client system awaiting confirmation of the message from said first request, said cockpit includes a manually activated confirmation device designed to generate a confirmation message and a router system to transmit said confirmation message to said remote client system awaiting message confirmation; said confirmation message, not generated in said first protocol, can be received by said remote system, and said router system includes at least one second link separate from said first link.

8. The transmission process as claimed in claim 7, further comprising that said router system includes a central confirmation unit separate from said remote client systems, and said central unit is connected, on one hand, to said confirmation device by said second link and, on the other hand, to said remote systems by other separate links.

9. An aircraft equipped with the cockpit as claimed in claim 7.

10. The transmission process as claimed in claim 9, comprising remote client systems connected to said cockpit, wherein said remote client systems are chosen from the group including a trio of identical computers, with said central confirmation unit connected to each of these computers; a remote client system and a computer to control said remote client system, with said computer connected to said remote client system by a third link separate from said first and second links, and a combination of these elements.

11. An aircraft cockpit comprising:
at least one display screen that can present a means of interactive indication to display a first request to send a message in a first communication protocol and to transmit said message to a remote client system over a first link using a second communication protocol; said remote client system includes at least one computer, wherein said cockpit has a communication interface designed, on one hand, to receive and generate messages in the first communication protocol and, on the other hand, to receive and generate messages that can be received by the remote client system, and wherein said remote client system awaiting confirmation of the message from said first request, said cockpit includes a manually activated confirmation device designed to generate a confirmation message and a router system to transmit said confirmation message to said remote client system awaiting message confirmation; said confirmation message, not generated in said first protocol, can be received by said remote system, and said router system includes at least one second link separate from said first link.

12. The aircraft cockpit as claimed in claim 11 further comprising that said router system includes a central confirmation unit separate from said remote client systems, and said central unit is connected, on one hand, to said confirmation device by said second link and, on the other hand, to said remote systems by other separate links.

13. The aircraft cockpit as claimed in claim 11, further comprising remote client systems connected to said cockpit, wherein said remote client systems are chosen from the group including a trio of identical computers, with said central confirmation unit connected to each of these computers; a remote client system and a computer to control said remote client system, with said computer connected to said remote client system by a third link separate from said first and second links, and a combination of these elements.

* * * * *

UNITED STATES PATENT AND TRADEMARK OFFICE
CERTIFICATE OF CORRECTION

| | | |
|---|---|---|
| PATENT NO. | : 8,125,351 B2 | Page 1 of 1 |
| APPLICATION NO. | : 12/465775 | |
| DATED | : February 28, 2012 | |
| INVENTOR(S) | : Cabaret et al. | |

It is certified that error appears in the above-identified patent and that said Letters Patent is hereby corrected as shown below:

Title Page, Column 2, Item (57) Abstract, Line 10 delete "protocol" and insert -- protocol, --, therefor.

Column 8, Claim 5, Line 66 delete "ink" and insert -- link --, therefor.

Signed and Sealed this
Twenty-ninth Day of May, 2012

David J. Kappos
*Director of the United States Patent and Trademark Office*